(12) United States Patent
Massey

(10) Patent No.: US 8,091,107 B2
(45) Date of Patent: Jan. 3, 2012

(54) METHODS AND APPARATUS FOR PRESENTING A DIGITAL VIDEO WORK CUSTOMIZED TO VIEWER PREFERENCES

(76) Inventor: Kent Massey, Gladwyne, PA (US)

( * ) Notice: Subject to any disclaimer, the term of this patent is extended or adjusted under 35 U.S.C. 154(b) by 2709 days.

(21) Appl. No.: 10/003,187

(22) Filed: Oct. 29, 2001

(65) Prior Publication Data

US 2002/0053083 A1    May 2, 2002

Related U.S. Application Data

(60) Provisional application No. 60/244,242, filed on Oct. 30, 2000.

(51) Int. Cl.
*H04N 5/445* (2011.01)

(52) U.S. Cl. .............. 725/61; 725/24; 725/38; 725/105; 725/135; 455/2.01

(58) Field of Classification Search .............. 725/34–36, 725/60, 46, 24, 61
See application file for complete search history.

(56) References Cited

U.S. PATENT DOCUMENTS

| | | | |
|---|---|---|---|
| 4,264,924 A | 4/1981 | Freeman | 358/86 |
| 4,264,925 A | 4/1981 | Freeman et al. | 358/86 |
| 4,305,131 A | 12/1981 | Best | 364/521 |
| 4,333,152 A | 6/1982 | Best | 364/521 |
| 4,445,187 A | 4/1984 | Best | 364/521 |
| 4,569,026 A | 2/1986 | Best | 364/521 |
| 4,591,248 A | 5/1986 | Freeman | 352/133 |
| 4,846,693 A | 7/1989 | Baer | 434/308 |
| 5,051,822 A | 9/1991 | Rhoades | 358/86 |
| 5,099,422 A | 3/1992 | Foresman et al. | 364/401 |
| 5,161,034 A | 11/1992 | Klappert | 358/342 |
| 5,393,072 A | 2/1995 | Best | 273/434 |
| 5,465,384 A | 11/1995 | Bejan et al. | 455/2 |
| 5,604,855 A | 2/1997 | Crawford | 395/173 |
| 5,607,356 A | 3/1997 | Schwartz | 463/31 |
| 5,611,694 A | 3/1997 | Bromley | 434/311 |
| 5,634,849 A | 6/1997 | Abecassis | 463/30 |
| 5,664,046 A * | 9/1997 | Abecassis | 386/125 |
| 5,679,075 A | 10/1997 | Forrest et al. | 463/9 |
| 5,694,162 A * | 12/1997 | Freeny, Jr. | 725/116 |
| 5,708,846 A | 1/1998 | Ryan | 395/827 |
| 5,737,527 A | 4/1998 | Shiels et al. | 395/200.09 |
| 5,751,953 A | 5/1998 | Shiels et al. | 395/200.09 |
| 5,754,770 A | 5/1998 | Shiels et al. | 395/200.09 |
| 5,810,599 A | 9/1998 | Bishop | 434/157 |
| 5,827,120 A | 10/1998 | Kikuchi et al. | 463/40 |
| 5,841,741 A | 11/1998 | Freeman | 369/33 |
| 5,848,934 A | 12/1998 | Shiels et al. | 463/9 |
| 5,855,512 A | 1/1999 | Aoyama et al. | 463/1 |
| 5,882,262 A | 3/1999 | Ballhorn | 463/43 |
| 5,894,320 A * | 4/1999 | Vancelette | 725/138 |

(Continued)

OTHER PUBLICATIONS

"Abbreviate." Merriam-Webster's Collegiate Dictionary. 10th ed. 1998.*

(Continued)

*Primary Examiner* — Farzana Hossain

(57) ABSTRACT

Methods for producing a digital video work to be presented in potentially viewable scenes with the ability to customize the scene sequences presented to individual viewers based upon expressed or imputed viewer preferences, and to the articles on which such work is stored and played. The content of the scene sequences may vary to match viewer preferences while maintaining the overall message of the digital video work.

5 Claims, 2 Drawing Sheets

U.S. PATENT DOCUMENTS

| | | | | |
|---|---|---|---|---|
| 5,915,256 | A | 6/1999 | Rogers et al. | 707/501 |
| 5,933,811 | A | 8/1999 | Angles et al. | 705/14 |
| D414,173 | S | 9/1999 | Amron | D14/124 |
| D414,174 | S | 9/1999 | Amron | D14/124 |
| D414,175 | S | 9/1999 | Amron | D14/124 |
| D414,176 | S | 9/1999 | Amron | D14/124 |
| D416,249 | S | 11/1999 | Amron | D14/124 |
| D416,889 | S | 11/1999 | Amron | D14/124 |
| 5,999,172 | A | 12/1999 | Roach | 345/302 |
| 6,001,015 | A | 12/1999 | Nishiumi et al. | 463/38 |
| 6,007,428 | A | 12/1999 | Nishiumi et al. | 463/36 |
| D418,503 | S | 1/2000 | Amron | D14/124 |
| D418,829 | S | 1/2000 | Amron | D14/124 |
| D419,153 | S | 1/2000 | Amron | D14/124 |
| D419,986 | S | 2/2000 | Amron | D14/124 |
| D419,987 | S | 2/2000 | Amron | D14/124 |
| D420,662 | S | 2/2000 | Amron | D14/124 |
| 6,022,274 | A | 2/2000 | Takeda et al. | 463/44 |
| D421,980 | S | 3/2000 | Amron | D14/124 |
| 6,041,310 | A * | 3/2000 | Green et al. | 705/27 |
| 6,101,485 | A | 8/2000 | Fortenberry et al. | 705/27 |
| 6,102,803 | A | 8/2000 | Takeda et al. | 463/38 |
| 6,106,399 | A | 8/2000 | Baker et al. | 463/42 |
| 6,139,433 | A | 10/2000 | Miyamoto et al. | 463/32 |
| 6,139,434 | A | 10/2000 | Miyamoto et al. | 463/32 |
| 6,155,926 | A | 12/2000 | Miyamoto et al. | 463/32 |
| 6,186,896 | B1 | 2/2001 | Takeda et al. | 463/38 |
| 6,200,253 | B1 | 3/2001 | Nishiumi et al. | 563/47 |
| 6,213,871 | B1 | 4/2001 | Yokoi | 463/7 |
| 6,222,925 | B1 | 4/2001 | Shiels et al. | 380/211 |
| 6,227,966 | B1 | 5/2001 | Yokoi | 463/1 |
| 6,241,611 | B1 | 6/2001 | Takeda et al. | 463/38 |
| 6,298,482 | B1 * | 10/2001 | Seidman et al. | 725/101 |
| 6,385,592 | B1 | 5/2002 | Angles et al. | 705/14 |
| 6,473,903 | B2 * | 10/2002 | Balakrishnan et al. | 725/135 |
| 6,671,880 | B2 * | 12/2003 | Shah-Nazaroff et al. | 725/22 |
| 6,698,020 | B1 * | 2/2004 | Zigmond et al. | 725/34 |
| 6,947,966 | B1 * | 9/2005 | Oko et al. | 709/203 |
| 2001/0013123 | A1 | 8/2001 | Freeman et al. | 725/34 |
| 2001/0051876 | A1 | 12/2001 | Seigel et al. | 705/1 |
| 2002/0013943 | A1 * | 1/2002 | Haberman et al. | 725/39 |
| 2004/0226042 | A1 * | 11/2004 | Ellis | 725/43 |

OTHER PUBLICATIONS

"Impute." Merriam-Webster's Collegiate Dictionary. 10th ed. 1998.*
"Intersperse." Merriam-Webster's Collegiate Dictionary. 10th ed. 1998.*

* cited by examiner

METHODS AND APPARATUS FOR PRESENTING A DIGITAL VIDEO WORK CUSTOMIZED TO VIEWER PREFERENCES

RELATED APPLICATIONS

This application claims the benefit of the earlier filing date of provisional application Ser. No. 60/244,242, filed Oct. 30, 2000.

FIELD OF INVENTION

The invention relates to the field of digital video production and delivery to viewers. The invention is directed to methods for producing a digital video work to be presented in potentially viewable scenes with the ability to customize the scene sequences presented to individual viewers based upon expressed or imputed viewer preferences, and to the articles oil which such work is stored and played. The invention allows variations in the content of the scene sequences to match viewer preferences maintaining the overall message of the digital video work.

BACKGROUND OF THE INVENTION

The above-identified provisional application described a method of presenting a digital video work that is customized to viewer preferences in the context of structuring scene sequences for interactive entertainment. That use of the invention is described in detail in this inventor's utility application Ser. No. 10/003,196 (published as U.S. Patent Application Publication No. 2002/0053089, the content of which is incorporated herein by reference.

Another potential use of the subject matter disclosed in the provisional application relates to the structuring of digital video scene sequences to be delivered to a viewer in modules for purposes other than interactive entertainment. In prior art structure of digital video, a digital video work is produced by designing and editing modular segments or "scenes", with the scenes having some degree of transitional and continuity content so that they can be presented to a viewer in a fixed order that appears as a continuous work. Every viewer, however, generally sees the same content in the work. The exception is a digital video work that is produced in modules and has some selection means for the viewer to choose which module to view next. Even if the work allows the viewer to select the order of modules for viewing, however, each viewer making the identical selection of modules will see the identical scene sequences.

An objective of this invention is to provide a digital video work that can be customized to a viewer based upon information about the particular viewer, or choices made by the viewer, and be presented in a manner that customizes the content to the particular viewer while still appearing to be a continuous work that delivers the overall content.

BRIEF SUMMARY OF THE INVENTION

The invention includes methods for producing and delivering a digital video work that can be customized to a viewer by designing many of the scenes as alternative scenes that can be automatically selected by control functions of the video player based upon information about the particular viewer or choices made by the viewer, and be presented in a seamless manner that customizes the content to the particular viewer while still appearing to be a continuous work.

The invention can be used to customize any digital video production where the video player can receive some information about the particular viewer that can be related to viewer preferences. In practice, the designer of the digital video work decides how he will determine viewer preferences, and then scripts the digital video scenes to have a number of fixed scenes that advance the work's message regardless of the viewer preferences and a number of alternative scenes that can be automatically interspersed into the scene sequences to customize to viewer preferences.

When the invention is used in a digital video work that permits the viewer to make choices about which modules or scene sequences to view next, alternative scenes can also be scripted to avoid repetition of scenes or information already seen by the viewer.

The invention can be used to produce customized digital video productions having a wide variety of uses, including education, advertising, marketing, electronic commerce, games and entertainment. In its simplest usage, it could be used to customize a short television advertisement for delivery over interactive television, based upon known or inferred preferences of the particular viewer. The examples described in detail herein uses the invention for marketing a product (automobiles) on a distributor's Internet web site. The invention is not, however, intended to be limited to that use or embodiment.

BRIEF DESCRIPTION OF THE DRAWINGS

For purposes of illustrating the invention, the drawings show forms that are presently preferred; it being understood, however, that this invention is not limited to the precise arrangements shown in these drawings.

DETAILED DESCRIPTION OF THE INVENTION

As an example of the invention, an automobile manufacturer may wish to provide its local dealerships with digital video scenes advertising the manufacturer's car models and features, to be stored in individual dealership's Internet web site where they can be displayed to an Internet visitor. While the prior art of digital video advertising would encompass merely structuring digital video scenes in modules of fixed scene sequences under a selectable heading (i.e Camaro, Silverado, et cetera), it would be far preferable to structure the modules to be presented to the site visitor to contain more personalized content related to the visitor's likely interest as determined from his or her decisions, stated preferences and/or demographics. This invention enables the scenes to be presented in scene sequences having some content customized to the viewer's likely preferences, as determined by the visitor's decisions, expressed preferences or demographics.

Figure 1:
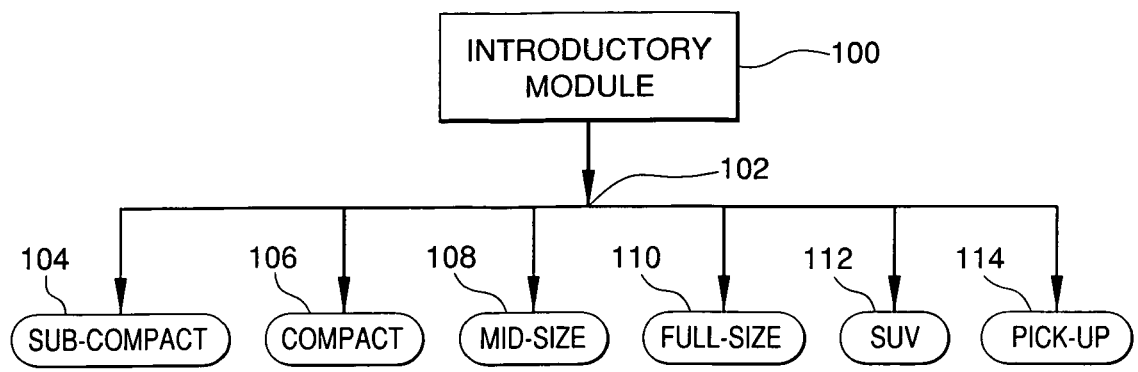
FIG. 1 is a flow chart showing a top level structure of a digital video work for marketing automobiles on the web site of an automobile distributor, in which digital video scenes are available to be displayed to a viewer in modules.

Referring now to FIG. 1, a car dealership's web site contains digital video work (100) for advertising the products and services of the dealership. The work is embodied in the form of a plurality of potentially viewable scenes to be delivered to an Internet viewer in modules. The first module is an introductory module (100) that contains digital video scenes, which are mostly specific to the local dealership, for the purpose of welcoming the visitor and introducing the dealership. The introductory module may include a scene where the visitor is prompted to enter some identifying and demographic personal information, such as name, address, age, sex and employment. At the conclusion of the introductory module is a scene (102) in which the visitor is asked what model vehicle he would like to be shown. The model names may be displayed in the scene as on-screen buttons for the visitor to select by a mouse-click. As shown in the schematic structure of FIG. 1, this prompt scene (102) is a decision point that will determine the next module of scenes to be delivered to the visitor. The various modules that can be selected at this decision point are represented generically as: subcompact (104), compact (106), mid-size (108), full-size (110), SUV (112) and pick-up (114).

Figure 2:
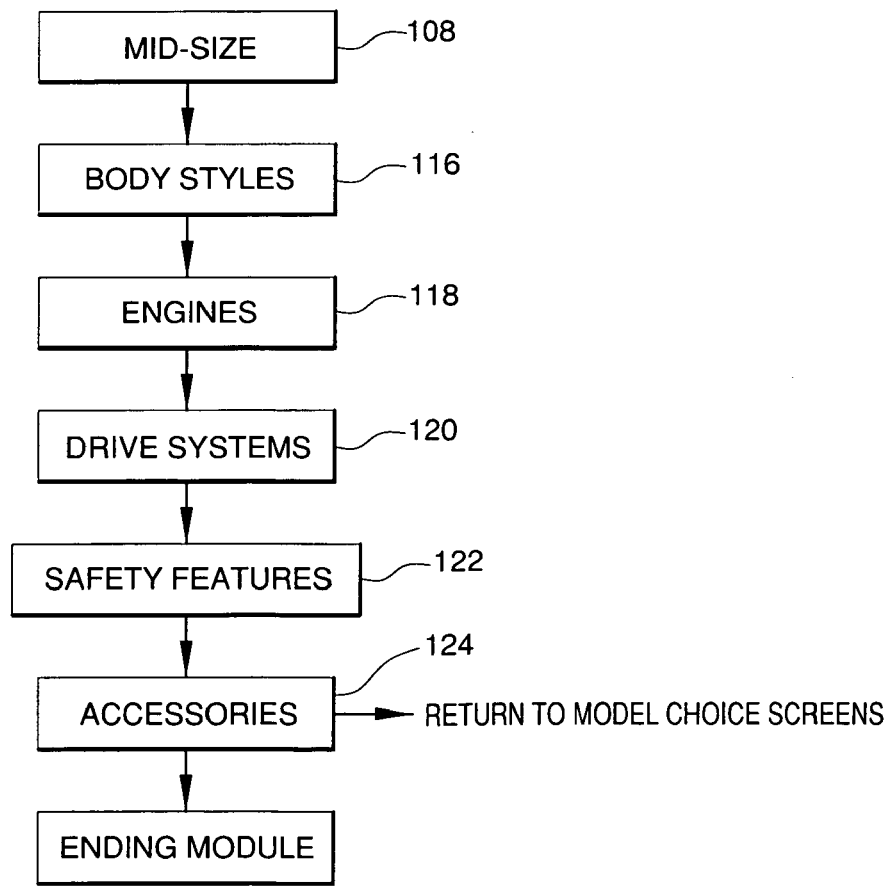
FIG. 2 is a flow chart showing a second level structure of modules within one of the modules of FIG. 1.

The selection of one of the automobile models leads the visitor to modules of digital video scenes prepared for that model. However, since the web site designer does not know in advance what model will be selected as the first choice, the scene sequences in the module are likely to include scenes describing features that the selected model shares with other models in the product line. For examples, all models may have the same all-wheel drive system, or the standard engine on the full-size model may be the optional engine for the mid-size model. Hence, if the visitor chose to see the mid-size automobile first (see FIG. 2), the module (108) presented to the visitor would be followed by modules (116, 122, 124) containing digital video scenes that are specific to the mid-size model and modules containing one or more scene sequences describing the all-wheel drive feature (120) and the available engines (118), including optional engine.

If, however, the visitor had chosen to hear about the full-size vehicle first and the mid-size later, it would not appear to be a seamless interactive work if the same or substantially similar scenes were used to again describe the drive system and engine in essentially the same detail as if the visitor were hearing about these features for the first time. In accordance with this invention, the module would contain a set of alternative scenes for the drive system and the engine. If the viewer were being informed of a feature for the first time, a scene of detailed information would be selected from the set and interspersed with other fixed scenes in the module (118, 120) to form the detailed scene sequences for the feature. If the viewer had previously seen detailed information on the feature, one or more alternative scenes with more abbreviated information would be taken from the set and interspersed with the fixed scenes in the module. For example, the detailed all-wheel drive scene sequence could be replaced by single scene in which a character says "The mid-size model uses the exact same all-wheel drive system you saw on the full-size model." Thus, the selection and use of alternative scenes in the module depends upon the order in which the module is viewed.

Figure 3:
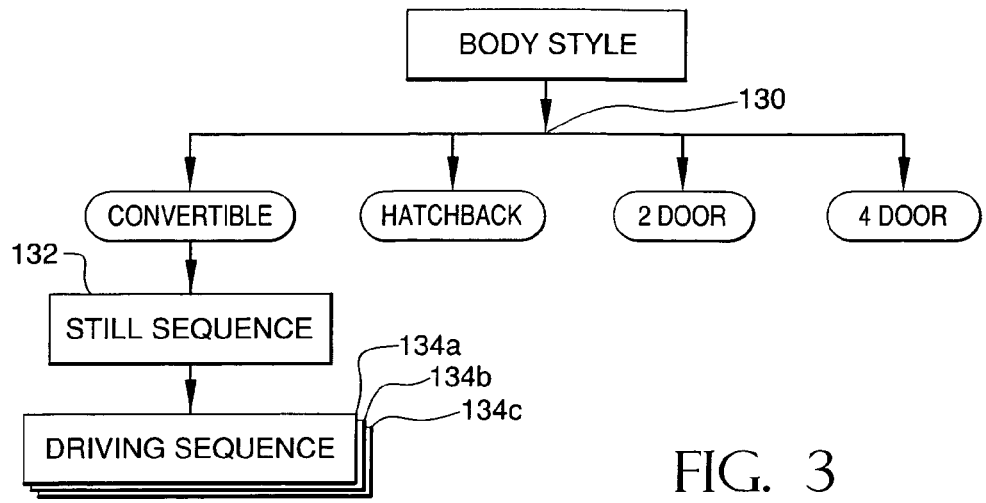
FIG. 3 is a flow chart showing the structure of alternative scenes that may be interspersed with fixed scenes to customize a scene sequence to match viewer preferences.

Preferences expressed by the viewer inside a module can also determine the scenes displayed to the visitor, as can preferences assumed from the demographic profile of the viewer. Once inside the module, the viewer could be asked which of several body styles the viewer would like to see the model presented in. These preferences could appear as on-screen choice buttons, such as convertible, hatchback, 2-door coupe, and 4-door coupe. As shown. As shown in FIG. 3, this choice screen presents another decision point (130). If the viewer first selects "convertible" the digital video player may begin a scene sequence in which the initial scene (132) is staged in a show room using a mid-size convertible as its main prop, and the following scene is a the mid-size convertible being driven in a setting customized to the viewer. If the demographics show the viewer to be a 25 to 35 year-old male, the video player is programmed to use that information to select from a set of alternative scenes (134a, 134b, 134c), to be interspersed next in the sequence, a scene (134a) showing a male actor of comparable age driving the convertible in settings associated with single younger males activities. If the demographics show a 55-65 year-old male, however, the player would select and intersperse a different alternative scene (134b) from the set, showing a male actor of comparable age driving the convertible in different settings. This type of alternative scene sets can be used to intersperse customized alternative scenes into scene sequences between purely informational fixed scenes that describe the features of the vehicle rather than allude to the driving or owning experience.

Figure 4:
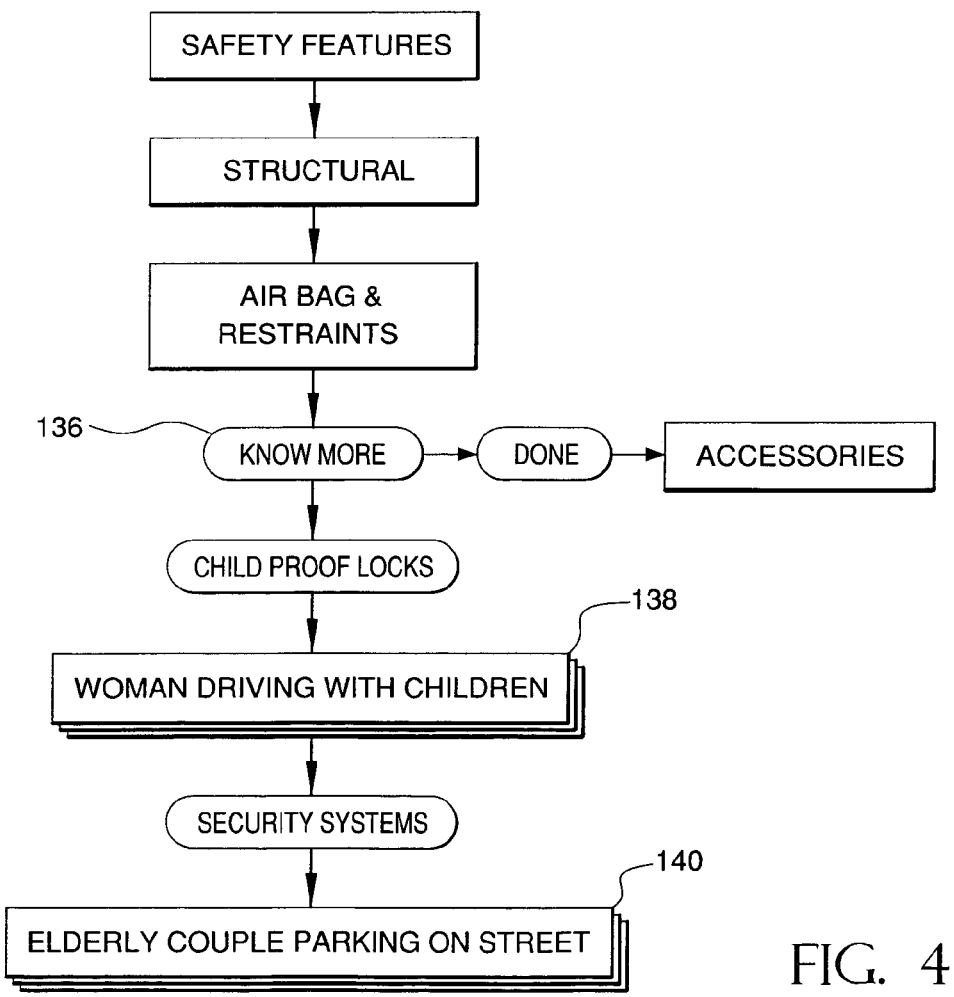
FIG. 4 is a flow chart showing the another structure of alternative scenes that may be interspersed with fixed scenes to customize a scene sequence to match viewer preferences.

Similarly, decisions made by the viewer and any known demographics may be used to insert additional choice prompts into the scene sequence. For example, as shown in FIG. 4, if the model selected and the demographics identify or make the visitor likely to be a woman with young children, the scene sequence could be structured with a decision point screen (136) after describing he basic safety features of the model, to ask . . . "Would you like to know more about the safety features of this model". If the choice were yes, alternative scenes for the safety features could include a digital video scene of a woman driving with young children (138) interspersed in the scene sequence with the purely informational scenes about the safety systems. If the answer is "No", then the additional safety features would be skipped and the system would remember to not ask the same question when the viewer asks to see another model. The same technique can be used if the demographics indicate an elderly viewer. The interspersed activity scenes would then be of an older driver or couple (140).

In one tangible embodiment of the invention, the scenes used in the various modules can be supplied to the local distributors by the automobile manufacturer, and the distributors can add scenes specific to themselves or to the locale. The introductory module, for example, will likely contain many scenes specific to the distributor, and so will the ending module. Distributor specific scenes can be interspersed in the other modules. Alternative scenes related to dealership locale can also be used. For example, a driving scene on a Southern California dealer's website could show the vehicle driven along a beachside highway, while the comparable scene for a dealer in Vermont might show the vehicle driven on a mountain highway in fall foliage. Alternatively, the introductory scene and dealer could be created and stored on the dealership web sites, and the modules related to the vehicle models and features, including the alternate scenes and the programming to select and intersperse alternative scenes could reside on a master server maintained by the car manufacturer, and be linked to by the visitor's act of first selection of a model.

The later type of link to a master server containing the fixed and alternative scones would be particularly useful where the information about probable user preferences is derived in whole or part from external data. In the example proposed earlier of a customized short commercial, the information of probable user preferences may come from the television programs and movies ordered or viewed by a residential account from a cable or satellite TV service. Other sources may be catalog and magazine customer lists and purchasing history, merely regional area demographics. The information may be used alone or in combination to select one or more alternative scenes to be placed in the sequence of the commercial to customize the content to the viewer's apparent preferences.

The interactive digital video work described above can be made by composing and filming scenes with a digital video camera. The individual scenes can be stored on computer hard drive or file server, although any suitable digital video storage medium such as a compact disk (CD) or DVD could be used for storage of the work. The programming of modules, scene sequences, branching points, display of alternative decisions to prompt the viewer, and decision buttons for detecting the user's decisions may be done with software such as an executable projector software package, such as Macro Media Director™. The work may be played with viewer software such as Apple QuickTime™, and displayed on a computer having a connection to Internet service. If the work is distributed on CD or DVD, the work can be played with a general purpose computer and viewer software—no Internet access is necessary. The work may also be delivered over an interactive cable TV network.

Although the invention is described in the form of a digital video work for marketing products over the Internet, the invention is not intended to be limited to embodiment or use. The principles of the invention describe herein are adaptable to works used for education or other reasons for distributing information as a digital video work. The scope of the invention should determined by the claims, which follow.

I claim:

1. A method of presenting an interactive digital video work used for marketing products or services to potential purchaser viewers that can customize the content presented after branching points to a particular viewer based upon the viewer's preferences, the method comprising the steps of:
   (a) providing a plurality of potentially viewable scenes to deliver information content about products or services to a viewer;
   (b) delivering some of the scenes to the viewer as the branching points at which alternative decisions are presented to the viewer that will determine the next scene sequence to be presented to the viewer;
   (c) for each alternative decision at each branching point, having available to present to the viewer a scene sequence corresponding to the alternative decision;
   (d) enabling the viewer to select one of the alternative decisions;
   (e) in response to the viewer's selected one of the alternative decisions, presenting the scene sequence that corresponds to the selected decision
   (f) tracking the viewer's cumulative selected decisions and imputing that particular viewer's preferences and interests based on the viewer's selected decisions;
   (g) producing one or more sets of variation scenes that introduce the information content that address the different possible viewer preferences and interests, based on previous decisions selected from among the alternative decisions presented prior to the scene sequence, each set of variation scenes being associated with a scene that is viewable after the branching points; and
   (h) when the viewer is brought to a scene sequence that contains one of the sets of variation scenes, interspersing into the scene sequence the variation scene corresponding to the viewer's imputed preferences and interests for such products or services, based on the viewer's selected one of the alternative decisions from among the alternative decisions presented prior to the scene sequence.

2. A method for presenting an interactive digital video work for marketing products or services to potential purchasers, wherein content of the interactive digital video work can be customized based upon each viewer's decisions, the method comprising the steps of:
   (a) providing a plurality of potentially viewable scenes to deliver to a viewer in a plurality of modules, each module containing potentially viewable scenes about a product or service;
   (b) in at least one of the modules, presenting to the viewer a set of alternative decisions, each alternative decision determining an order in which a subsequent module will be presented;
   (c) enabling the viewer to select one of the alternative decisions;
   (d) in each module that can be presented in a different order, providing neutral scenes in which the content is not dependant upon the order in which the module is viewed, and providing sets of alternative scenes in which the content is dependant upon the order in which the module is viewed;
   (e) prompting the viewer to select one of the alternative decisions that will determine the order of a subsequent module;
   (f) presenting to the viewer neutral scenes interspersed with alternative scenes that correspond to the viewer's selected one of the alternative decisions and are appropriate to the relative order in which the subsequent module is presented.

3. A method as in claim 2, wherein the work is used for marketing goods or services to potential purchasers, the plurality of potentially viewable digital scenes conveying information about such goods or services; and the step of presenting to the viewer neutral scenes interspersed with alternative scenes that correspond to the viewer's selected one of the alternative decisions and are appropriate to the relative order in which the module is presented includes presenting alternate scenes to avoid repeating information already conveyed to the viewer in previous scenes.

4. A method for presenting an interactive digital video work for marketing products or services to potential purchasers, wherein content of the interactive digital video work can be customized based upon each viewer's decisions, the method comprising the steps of:
   (a) providing a plurality of potentially viewable scenes to deliver to a viewer in a plurality of modules, each module corresponding to a product or service, wherein the potentially viewable scenes of each such module provide information about attributes of the product or service;
   (b) for attributes which are common to more than one product or service, producing some of the potentially viewable scenes to provide comprehensive information about the attribute and alternative scenes to provide abbreviated information about the attribute;
   (c) delivering some of the potentially viewable scenes to the viewer as branching points at which alternative decisions are presented that will determine a scene sequence to be presented to the viewer;
   (d) enabling the viewer to select one of the alternative decisions;
   (e) prompting the viewer to select one of the alternative decisions; and
   (f) in response to the viewer's selected one of the alternative decisions, presenting to the viewer, in each module that correspond to the selected alternative decision and that can be presented in a different order, the scenes providing comprehensive information for attributes not previously presented to the viewer in an earlier module and the alternative scenes providing abbreviated information for attributes previously presented to the viewer in an earlier module.

5. A method for presenting an interactive digital video work for marketing products or services to potential purchasers, wherein content of the interactive digital video work can be customized based upon each viewer's decisions, the method comprising the steps of:
- (a) providing a plurality of potentially viewable scenes to deliver to a viewer in a plurality of modules, each module corresponding to a product or service, wherein the potentially viewable scenes of each such module provide information about attributes of the product or service;
- b) in at least one module, providing basic scenes which provide information about an attribute that are presented to the viewer when the module is viewed, and providing a set of alternative scenes which are only presented to the viewer in response to an interactive request by the viewer for additional information;
- (c) presenting to the viewer, at branching points that follow a basic scene providing information about an attribute, alternative decisions enabling the viewer to request additional information about the attribute that determine the next scene sequence to be presented to the viewer;
- (d) enabling the viewer to select one of the alternative decisions;
- (e) prompting the viewer to select one of the alternative decisions;
- (f) presenting to the viewer in response to the viewer's selected alternative decision the set of alternative scenes that correspond to the selected alternative decision,
- (g) for attributes which are common to more than one product or service, recalling whether the viewer made an alternative decision regarding the same attribute in a earlier viewed module, and
- (h) if the viewer has made an alternative decision requesting additional information about the same attribute in a previously viewed module, not prompting the viewer to make the same decision in a later module.

* * * * *